US005435061A

United States Patent [19]

Lantz

[11] Patent Number: 5,435,061

[45] Date of Patent: Jul. 25, 1995

[54] METHOD OF MANUFACTURING A STATIC MIXING UNIT

[75] Inventor: Bernard L. Lantz, Wichita, Kans.

[73] Assignee: Koch Engineering Company, Inc., Wichita, Kans.

[21] Appl. No.: 840,449

[22] Filed: Feb. 24, 1992

[51] Int. Cl.[6] ........ B23P 15/00

[52] U.S. Cl. ........ 29/890.14; 29/469

[58] Field of Search ........ 29/890.14, 469; 366/340; 165/109.1; 138/38, 42, 43

[56] References Cited

U.S. PATENT DOCUMENTS

| | | | |
|---|---|---|---|
| 4,062,524 | 12/1977 | Brauner et al. . | |
| 4,068,830 | 1/1978 | Gray | 366/340 |
| 4,207,009 | 6/1980 | Glocker | 366/340 |
| 4,211,277 | 7/1980 | Grosz-Röll et al. | 165/109.1 |
| 4,352,378 | 10/1982 | Bergmann et al. | 138/38 |
| 4,378,640 | 4/1983 | Buchholz | 165/109.1 |
| 4,382,684 | 5/1983 | Hori | 366/340 |
| 4,632,568 | 12/1986 | Emele et al. | 366/340 |
| 4,670,103 | 6/1987 | Hall | 165/109.1 |
| 4,909,635 | 3/1990 | Lecoffre et al. | 366/340 |
| 4,936,689 | 6/1990 | Federighi et al. | 138/42 |

OTHER PUBLICATIONS

"Static Mixing Technology", Bulletin KSM-6, Koch Engineering Company, Inc., 1991.

*Primary Examiner*—Irene Cuda
*Attorney, Agent, or Firm*—Richard P. Crowley

[57] ABSTRACT

A method of manufacturing a static-mixing element, which method includes forming selected subassemblies of the static-mixing element, having at least two layers of mixing blade elements, in a lattice-type structure, assembling the subassemblies in position in a fixture, joining the subassemblies together, to form the static-mixing element or one or more subassembly modules, and then joining the subassembly modules together, to form the entire static-mixing element. The subassemblies may be prepared of metal, by investment-casting or sintering, or a plastic or ceramic, by molding, and the subassemblies and subassembly modules formed by welding, sintering, bonding or fusing.

23 Claims, 3 Drawing Sheets

METHOD OF MANUFACTURING A STATIC MIXING UNIT

BACKGROUND OF THE INVENTION

There are a wide variety of motionless or static-mixing element designs used within a flow passageway for fluid-mixing and -contacting problems. A typical static-mixing unit comprises a series of stationary, rigid, mixing elements placed lengthwise in a conduit, to form a plurality of intersecting channels which split, rearrange and recombine one or more component fluid streams into smaller and smaller layers, until there is one homogeneous stream as an outlet stream. Generally, such motionless or static-mixing elements are made from twisted helixes, offset-stacked corrugated sheets or intersecting bars or blades welded together, to form the desired open channels, which are placed end to end along a section of a pipe, to form a particular static- or motionless mixing unit. One or more fluid streams to be mixed enter the pipe and are split into individual streams in the defined channels, which channels provide strong transversal flow and fluid exchange at the pipe wall. Part of each channel intersection causes a part of the fluid to shear off into a crossing channel. Generally, adjacent mixing elements are positioned 90° relative to each other, so that two-dimensional mixing takes place over the first static-mixing element, and three-dimensional mixing over all succeeding mixing elements.

Static-mixing elements and the method for preparing such elements, for the mixing of fluid streams, are described, for example, in U.S. Pat. No. 4,062,524, issued Dec. 13, 1977, hereby incorporated by reference. In this patent, pairs of comb-like plates are arranged, so that the webs of one plate extend crosswise through the slots of the other, and with the resulting mixing insert providing motionless mixing of fluid streams.

Static-mixing technology and static-mixing elements are described, for example, in Bulletin KSM-6, entitled "Static Mixing Technology" of Koch Engineering Company, Inc., 1991, hereby incorporated by reference. This publication describes, for example, a particular series of static-mixing element designs known as the SMX, SMXL and SMXL-R mixing elements, which are employed primarily in viscous mixing applications.

The static-mixing element designs, known as SMX, SMXL and SMXL-R (trademarks of Koch Engineering Company, Inc. of Wichita, Kans.), or similar mixing element designs, involving a plurality of flat-bladed, metal or plastic mixing elements, are generally prepared by stamping, nibbling, cutting or grinding individual blades, which are then shaped or bent to particular angles and welded, fastened or secured together, to form the static-mixing element. The entire mixing element also may be formed in one operation, such as by injection-molding with plastic, casting in metal, such as by the lost-wax process, metal-sintering, EDM-machining, or milling the static-mixing element shape from a solid block of material. Such blade-like, static-mixing elements, particularly when the mixing elements are about twelve inches in diameter or less; for example, one to three inches, are very difficult and time-consuming to manufacture and to assemble, and, consequently, are quite expensive. While large-diameter, blade-like, static-mixing elements may involve the same type of process, they are somewhat easier to manufacture, due to the larger size, but still the manufacture of the static-mixing elements tend to be time-consuming and expensive to fabricate.

It is, therefore, desirable to provide for a new and improved, low-cost, inexpensive, efficient method of manufacturing a metal, plastic, glass or ceramic static-mixing element or unit, and particularly, a flat, blade-type, static-mixing element or unit which is employed primarily in a laminar-flow or transitional-flow operation, in the mixing of high-viscosity liquids and fluids.

SUMMARY OF THE INVENTION

The present invention concerns a method of manufacturing a static-mixing element or unit, and to the subassembly, subassembly modules, subassembly elements and subassembly units so prepared.

The invention comprises a method of preparing a static-mixing element or unit for insertion in a flow passageway, typically, a cylindrical passageway; for example, twelve inches or less, such as one to three inches, with the static-mixing element or unit designed for use in the motionless mixing of one or more fluid streams in the flow passageway, by mixing blades which form the static-mixing element. The method comprises: preforming a plurality of subassemblies of the static-mixing element, which subassemblies, when arranged and secured together, form the static-mixing element, each subassembly comprising a plurality of spaced-apart mixing blades in at least a two-layer, lattice-type structure; positioning at least two of the subassemblies in prepared, aligned, contacting positions; securing together the subassemblies, to form the static-mixing element or a subassembly module; and optionally securing together a plurality of subassembly modules or a subassembly and one or more subassembly modules, to form the static-mixing element. The method includes the preparation of the static-mixing elements, by forming and joining defined, identical or nonidentical, lattice-type subassemblies and or subassembly modules together, particularly in small size, generally twelve inches or less, at greatly reduced cost, less time and in a more efficient manner.

Static-mixing units are currently fabricated employing many singular mixing elements or blades, which have to be joined into a single, static-mixing unit. The present method of manufacture may be employed in the preparation of present or future static-mixing units, and provides a method which has much lower manufacturing costs and is more efficient, by placing the subassemblies or subassembly modules, composed of a plurality of mixing blades, in a lattice-type structure, that are then joined, to form the desired static-mixing element. For example, in one illustration, a typical static-mixing unit, like the SMX static-mixing element, consists of a $\frac{1}{8}$-inch thickness of parallel blades across the diameter, and approximately 45° to 90° offset from the general line of flow passageways. The number of blades on the offset angle may vary from 4 to 32 blades in each static-mixing unit, while typically the offset angles for the blade elements would vary from 15° to 60°. Typically, adjacent layers of the blades are opposed to each other by twice the offset angle.

The method provides for fabrication and assembly employing subassemblies and subassembly modules that are economical. The subassembly and/or subassembly modules; for example, where the mixing blade elements are metal, may be formed together in a preformed casting cavity, by pouring metal or sintering in a furnace, that duplicates the individual blades of the static-mixing element or unit in size and position on a subassembly basis, which is a particular, selected portion of the static-mixing element. The prepared subassemblies are joined to constitute the entire static-mixing element or subassembly modules which are joined by subassemblies or another module, to form the entire static-mixing element. Where the static-mixing element is not comprised of metal blades, but is composed, for example, of ceramic, glass or plastic, the subassemblies may be injection-formed or otherwise formed or molded, through the employment of a hard molding polymer, and then fused or bonded together.

The subassemblies typically have at least two layers of spaced, mixing blade elements, such as three, four or more blade elements per layer. Generally, the mixing blade elements of each layer are at an angle to the mixing blade elements of the other or next layer; for example 90°, and the layers secured together in an integral, unitary fashion; for example, cast or sintered metal or molded plastic, lattice-type structure, to form the subassemblies. The subassemblies may vary in number, but, for small-diameter, static-mixing elements; for example, twelve inches or less, the number of subassemblies may be separate, but identical, subassemblies, to form the static-mixing element, or four subassemblies which form two, identical, subassembly modules. The subassembly modules, when all taken together in a joined manner, make up the entire static-mixing element.

The mixing blade elements, used in each subassembly, and the ultimate static-mixing element may vary in number, shape and position, depending upon the ultimate design of the static-mixing element and the flow passageway into which the static-mixing element is to be employed. In most cases, the flow passageway would constitute a cylinder, such as formed by a cylindrical pipe or conduit; thus, the outer edges of each subassembly and subassembly module would be so tapered arcuately, so as to provide for a close fit within the side walls of the cylindrical flow passageway in which the static-mixing element is to be inserted.

The method provides a unique method to lower significantly total manufacturing cost of the static-mixing element. There are two parts to total manufacturing cost: the tool cost, which is amortized; and the actual manufacturing cost for each part. At present, the following, general manufacturing methods are used: a labor-intensive method with minimal tooling cost and high parts cost; and expensive die cost with low parts cost. The present method provides for moderate die cost with moderate parts cost.

When tremendous quantities of a part must be produced, it is usually best to invest in an expensive die, to make large quantities of parts inexpensively, which minimizes handling. In cases where the required parts quantity is not small, yet not too large, it is usually best to invest in a less expensive die, as in the method, if possible, with the resulting parts being more expensive, but moderate in parts cost. The method deals with a moderate-cost die with moderate parts cost. The current methods used to produce these static-mixing elements has minimal tooling cost and high parts cost, and high tooling cost with low parts cost.

From a point of view of parts-manufacturing cost, the method described is not expected to give the least expensive, parts-manufacturing cost, because subassemblies are made which must be handled and put into a fixture, to create subassembly modules and then subassembly elements. It would be cheaper, from a total-cost-manufacturing point of view, to have a die which makes the entire subassembly element or static-mixing element in one operation. However, while such a method can be used to make some static-mixing elements where very large quantities are required, the parts-manufacturing cost is low, the die cost is very, very expensive, due to the many moving parts of the die required. Thus, the present method provides significant savings in total manufacturing cost, particularly die cost, and is simple, particularly for small-diameter, static-mixing elements.

In one method, for example, wherein an SMX static-mixing element or unit is prepared by using just two subassembly modules of two subassemblies each, a first subassembly, for the upper and lower sections of the SMX static-mixing element, is prepared comprising a two-layered, lattice-type structure, with the first layer having a full, arcuate section and two, arcuate half sections, and the second layer similarly composed, but at a 90° angle. The second subassembly would then compose two layers having, for example, spaced-apart, generally trapezoidal-type, blade-like elements on the first or top layer, and generally more rectangular elements in the bottom or second layer. The first and second subassemblies are rather simple, but the first subassemblies on the top and bottom, which are identical, and the two second subassemblies, which are identical and in between, form in total an SMX static-mixing element.

In one method, the subassemblies may be constructed of metal, by employing a lost-wax-casting process; that is, by forming a cavity, that duplicates the subassembly as desired., and then casting in metal, with the cast mixing elements all in desired positions to each other, when in the subassembly. Where the subassembly modules are made of plastic, then the subassembly modules may be injection- or otherwise molded or otherwise formed by plastic molding, assembling or forming techniques.

After the formation of the selected plurality of subassemblies to make up the static-mixing element, then the subassemblies are assembled and fixed in position and separately secured to each other, to form the static-mixing element or intermediate subassembly modules for joining together. Subassembly modules may be assembled in the final static-mixing element and then joined in one single operation. The joining together permits the individual mixing elements; for example, the blades, of the lower level of one individual module to be joined, secured, bonded, fused, sintered or welded to a contacting, cross, mixing blade element of the upper level of the lower subassembly module. Thus, the subassembly and modules may be joined by welding or solvent-bonding or other joining techniques. Typically, positioned fixtures are used, as well as jigs, to hold the subassembly or modules in a correct, defined position during the joining process, so as to make economical the accurate, fabrication assembly of the ultimate static-mixing element or unit.

In an illustration of the method of the invention in manufacturing static-mixing elements, the commercial SMXL-R and SMXL static-mixing elements are each composed of four, mixing blade elements, and can be prepared by forming two, identical subassemblies and then securing together the identical subassemblies, to form the complete static-mixing element. The SMX static-mixing elements each comprises an eight-blade mixing element. The SMX element can be prepared by forming two pairs of two different subassemblies, one subassembly representing the top and bottom quarter portion of the SMX element, and the other subassembly representing the middle two portions of the SMX element. The SMX element is then prepared by joining together the top and middle subassemblies and the bottom and middle subassemblies, and then joining together the first and second subassembly modules so prepared, such as by molding or where the blade elements are metal, to form the complete SMX static-mixing element.

In connection with the description of the method of the invention and the advantages of such method, various words and terms will be used to define the method. The term "static-mixing element" shall refer to a single, static-mixing element ready to be sold, containing a plurality of blade elements, which blade elements include rods, flat blades, bars and other form of elements, extending across the flow path of fluid streams, to induce fluid-stream, repetitive mixing. The term "subassembly" shall refer to a selected portion of the static-mixing element which is separately formed in the method, and generally comprises a two- or three-layered, lattice-type structure containing fixed blade elements. The subassemblies, when taken or secured all together, form the complete static-mixing element. The term "subassembly module" shall refer to a secured-together combination of at least two subassemblies, and which subassembly module does not comprise the entire static-mixing element, but only a portion thereof. The subassembly module may comprise, for example, two or more identical or nonidentical subassemblies, and wherein the subassembly modules are secured together with one or more subassemblies or subassembly modules, to form the static-mixing element. A "motionless" or "static-mixing unit" refers to two or more, aligned, static-mixing elements separately or joined together in a flow path, to provide for the desired mixing of one or more fluid streams passing through the flow path, typically within a pipe, conduit or housing. Where the static-mixing element is prepared in metal, by the use of subassemblies and subassembly modules, by casting or sintering techniques, such as by firing in a furnace, the static-mixing element, after assembly but before firing in a furnace, is referred to as a "subassembly element" and the static-mixing unit as a "subassembly unit".

The invention will be described for the purposes of illustration only in connection with certain specific embodiments. However, it is recognized that those persons skilled in the art may make various additions, modifications, changes and improvements to the illustrated embodiments, all falling within the spirit and scope of the invention.

DESCRIPTION OF THE EMBODIMENTS

Figure 1:
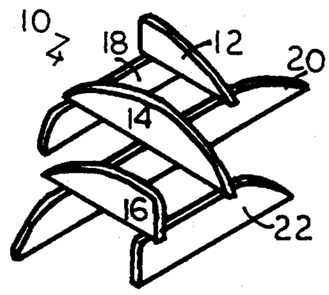
FIG. 1 is a perspective view of a first subassembly of the invention.

For the purposes of illustration only, the invention will be described in connection with the method of preparing an SMX static-mixing element, wherein FIG. 1 shows a first subassembly 10 cast integrally of metal comprising, as a first layer, three, spaced-apart, metal mixing blades of half-arcuate blades 12 and 16 and full-arcuate blades 14, and, as a second lower layer, three, spaced-apart, metal mixing blades of full-arcuate, trapezoidal blades 20 and half-arcuate, trapezoidal blades 18 and 22.

Figure 2:
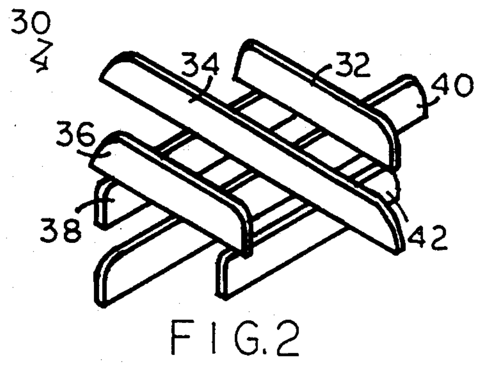
FIG. 2 is a perspective view of another subassembly of the invention.

FIG. 2 shows a second subassembly 30 cast integrally of metal composed of a first, upper layer of trapezoidal-type mixing blades of a full blade 34 and half blades 32 and 36, while the second, lower layer has trapezoidal, rectangular, full blade 40 and half blades 42 and 38.

Figure 3:
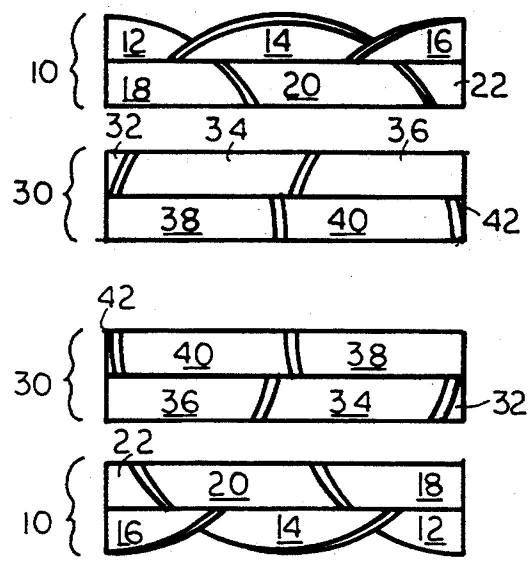
FIG. 3 is an exploded side view of the subassemblies of FIGS. 1 and 2 and positioned prior to assembly.
Figure 4:
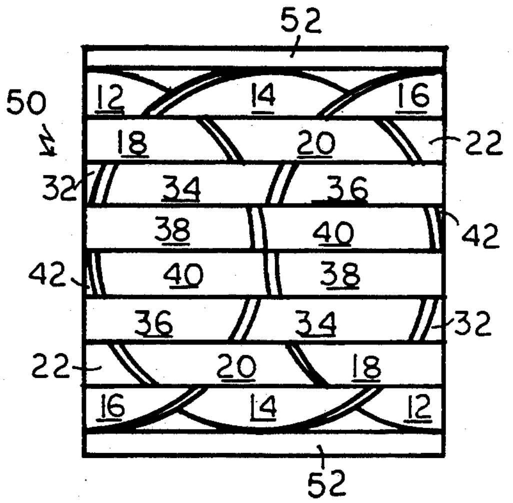
FIG. 4 is side view of a static-mixing unit after assembly.

FIG. 3 is a side exploded view of the subassemblies 10 and 30 in position prior to assembly, to make an SMX static-mixing element 50 which is to be disposed within a generally cylindrical conduit 52 (see FIG. 4). Subassemblies 10 and 30 are joined together by resistant-welding at contact points of the blade elements (see FIGS. 7 and 8), to form two, separate, but identical, subassembly modules, which subassembly modules are joined together to the complete element 50.

FIG. 4 is an illustration of two subassembly modules formed by securing together subassemblies 10 and 30, to form an SMX static-mixing element 50 shown in cylindrical conduit 52.

Figure 5:
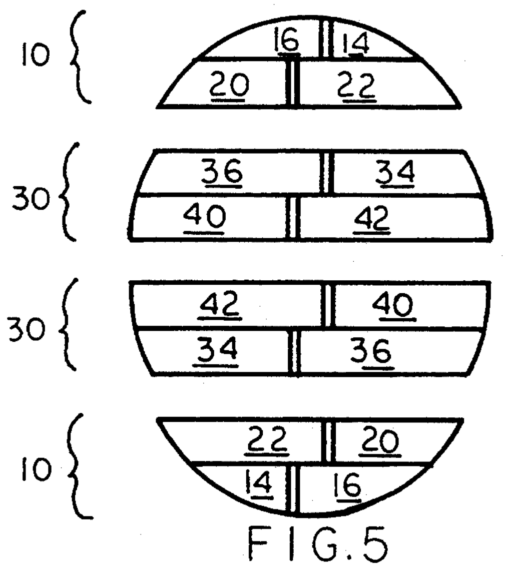
FIG. 5 is an exploded end view of the subassemblies of FIGS. 1 and 2 prior to assembly.
Figure 6:
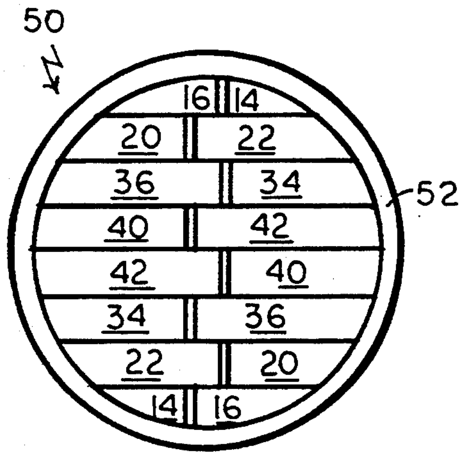
FIG. 6 is an end view of the simple, static-mixing element within a cylindrical flow passage.

FIG. 5 is an exploded side view of the subassemblies 10, 30 and 30, 10 prior to assembly, to form the SMX static-mixing element 50, while FIG. 6 shows a side view of the SMX static-mixing element 50 within the cylindrical conduit 52 after preparation. If desired and typically, the static-mixing elements 50 are employed in a plurality of elements within conduit 52, to form a static-mixing unit.

Figure 7:
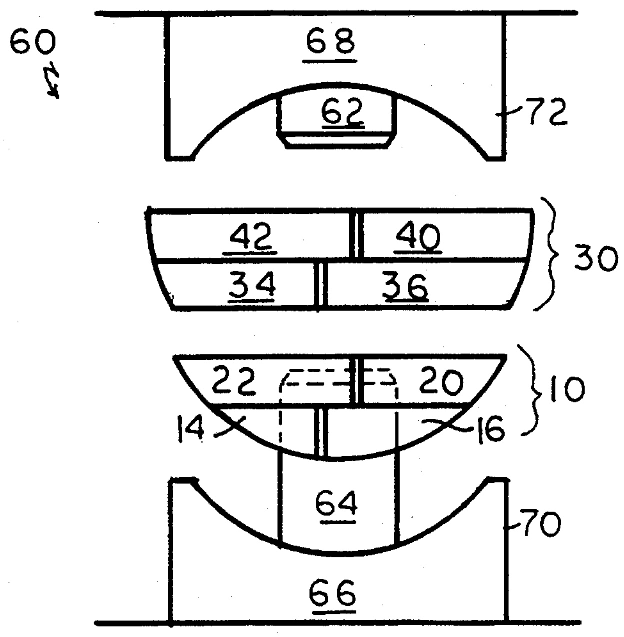
FIG. 7 is an illustrative, sectional view of the subassemblies of FIGS. 1 and 2 in joining assembly.
Figure 8:
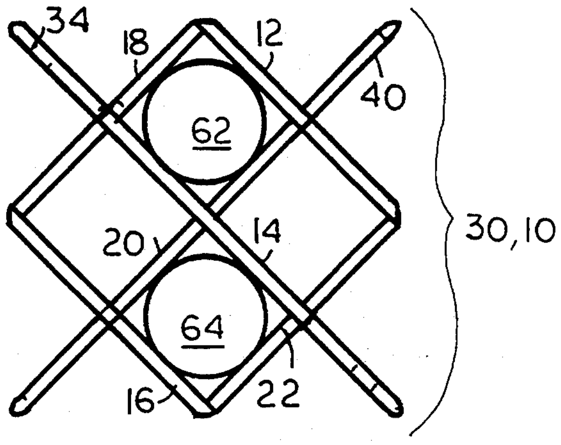
FIG. 8 is a top view of the joining assembly as shown in FIG. 7.

The SMX static-mixing elements 50, as illustrated in FIGS. 1–6, are formed of metal blades. FIG. 7 is an exploded view of subassemblies 10 and 30 within a fixture 60 composed of upper and lower parts 66 and 68, with the resistant-welding together of the subassemblies 30 and 10 at their blade contact points within the fixture 60, to form electric-weld contact points 70 and 72. The fixture parts 66 and 68 are so contoured in semicircular form, to permit one set of fixtures to be used to make a complete static-mixing element 50. The fixture 60 has phenolic nonconductors; that is, for example, resin guide pins 62 and 64, that fit within the blades of the subassemblies 10 and 30 (see FIG. 8), and position the subassemblies within the fixture 60. The phenolic guide pins 64 and 62 fit within the lattice-type structure of the subassemblies 10 and 30, and hold them in place for the welding together. The contour of the fixture 60 permits the subassemblies 30 and 10 to be position-welded together at the welding contact points, to form a subassembly module composed of subassemblies 10 and 30, and later another subassembly module. All four subassemblies; that is, positioned and aligned subassemblies 10, 30 and 30 and 10, may be resistant-welded together in a single operation. However, it is preferred merely to resistant-weld the subassemblies 10 and 30 at one time, to form a subassembly module, to provide for good resistant-welding bonding, rather than welding all subassemblies 10, 30 and 30 and 10 together. Subassembly modules, composed each of welded subassemblies 10 and 30, then can be joined together sequentially, to form the static-mixing element 50.

Figure 9:
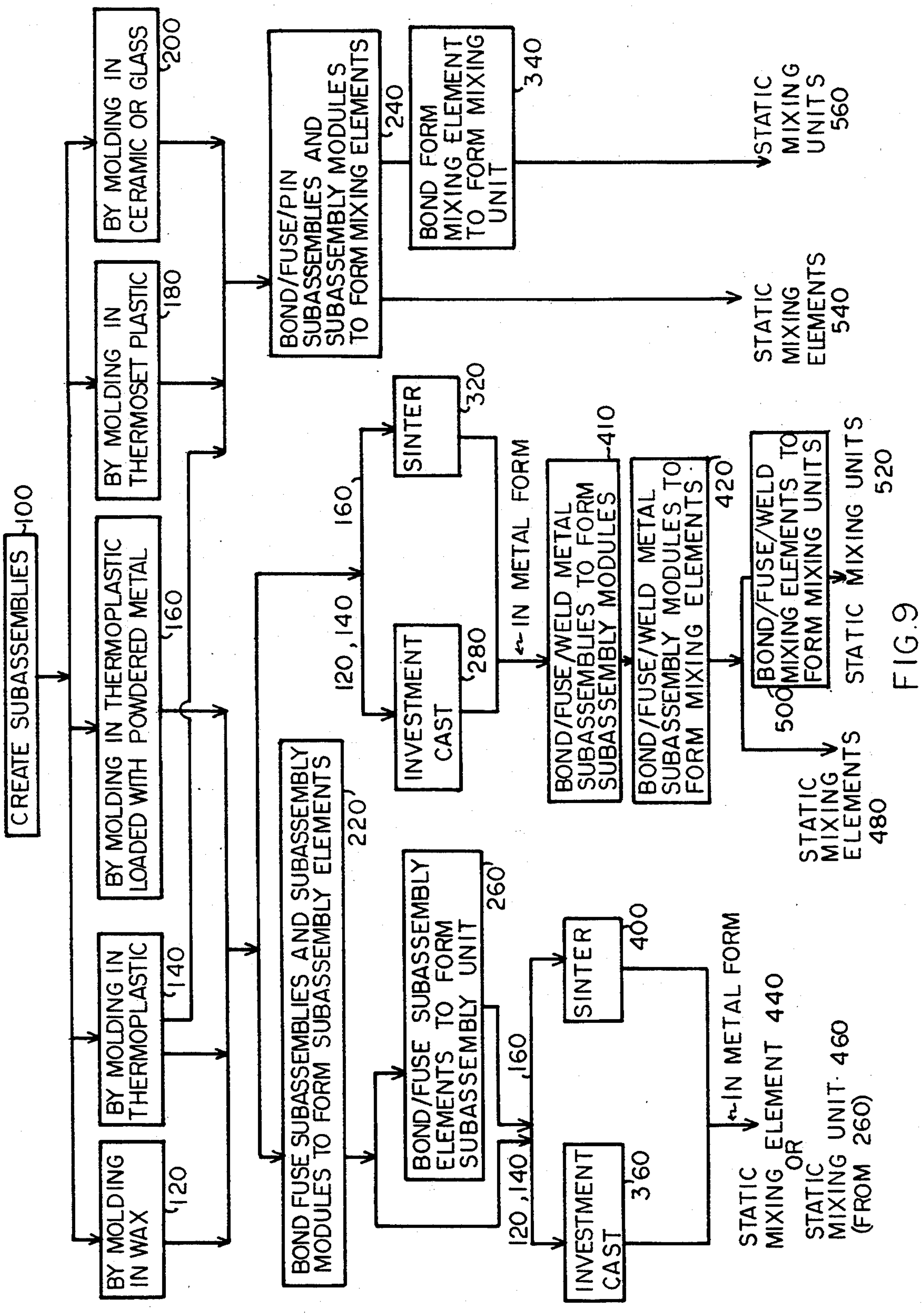
FIG. 9 is an illustrative, schematic flow diagram of methods showing various flow paths of various methods and techniques used in preparing the subassemblies, modules, static-mixing elements and units.

FIG. 9 shows various flow paths of various methods using standard manufacturing steps and techniques, such as casting, molding, lost-wax, bonding, fusing, sintering, welding, pinning, etc., to form subassemblies, subassembly modules and other components, to arrive at an integrally formed, static-mixing element or unit by the method of the invention.

The flow paths and methods described in FIG. 9, which are preferred methods, are represented as:

A) IN METAL CONSTRUCTION 1) ([120], [140]) / [160] — [220] — [360], [440] / [400], [440]; [220] — [260] — [360], [460] / [400], [460]

2) ([120], [140]), [280] / [160], [320] — [410], [420] — [480] / [500], [520]

B) IN PLASTIC CONSTRUCTION 1) ([140], [180], [200]), [240] — [540] / [340], [560]

With reference to FIG. 9, one method of the invention comprises creating subassemblies [100] by following the path:

a) molding the subassemblies 10 and 30 in wax [120] or thermoplastic [140], if the casting process [280] is to be used; or molding in thermoplastic loaded with powdered metal [160], if the sintering process is to be used.

b) investment-casting [280] the subassemblies 10 and 30, where a metal subassembly is formed; or sintering [320] the subassemblies 10 and 30, where a metal subassembly is formed.

c) placing the metal subassemblies [280] or [320] into a fixture 60, to create subassembly modules [410].

d) placing the metal subassembly modules [420] into a fixture 60, to create finished, metal, mixing elements [480].

In addition, path [500] may be added, where the completed mixing elements created in [420] may be put into a fixture, to create a metal, static-mixing unit.

Another method of the invention is described as follows:

Create subassemblies [100] by following the path:

a) mold the subassemblies 10 and 30 in wax [120] or thermoplastic [140], if the casting process [360] is to be used; or mold in thermoplastic loaded with powdered metal [160], if the sintering process [400] is to be used.

b) follow path [220] where subassemblies 10 and 30, which are still in the wax [120], thermoplastic [140], or thermoplastic loaded with powdered metal [160], are placed into a fixture similar to 60 and bonded or fused, to form subassembly modules, followed by subassembly elements. In addition, path [260] may be added, if an entire subaassembly unit is desired to be made, by placing into a horizontal fixture and bonding or fusing the subassembly elements, to create a subassembly unit containing the required number of mixing elements.

c) investment-cast [360] the subassembly elements or subassembly unit and create a metal, static-mixing element [440] or a static-mixing unit [460]; or sinter [400] the subassembly elements or subassembly unit and create a metal, static-mixing element [440] or a static-mixing unit [460].

A further method is described as follows:

Create subassemblies [100] by following the path:

a) mold the subassemblies 10 and 30 in thermoplastic [140], thermoset plastic [180] or ceramic or glass [200].

b) follow path [240] where subassemblies are placed into a fixture similar to 60 and bonded, fused or pinned, to form subassembly modules and mixing elements [540].

In addition, path [340] may be added, if an entire static-mixing unit [560] is desired to be made, by placing into a horizontal fixture and bonding or fusing the static-mixing elements [240], to create a static-mixing unit [560] containing the required number of mixing elements.

Thus, as an illustrated embodiment of the invention, the multibladed, SMX static-mixing unit may be prepared efficiently, by joining selected subassemblies and/or modules together, providing for a method of fabrication of the static-mixing elements which is less expensive and time-consuming and more efficient than present fabrication methods.

What is claimed is:

1. A method of manufacturing a static-mixing element for insertion in a flow passageway and for use in the motionless mixing of one or more fluid streams in the flow passageway, by mixing blades having blade edges which form the static-mixing element, which method comprises:

a) preforming a plurality of subassemblies of the static-mixing element, which subassemblies, when arranged and secured together, form the static-mixing element, each subassembly comprising a plurality of spaced-apart, mixing blades in at least a two-layered, open, lattice-type structure;

b) positioning at least two of the subassemblies in prepared, aligned, contacting positions;

c) securing together the subassemblies at selected blade edges to form the static-mixing element or a subassembly module; and d) positioning and securing together a plurality of subassembly modules or a subassembly and one or more subassembly modules, to form the static-mixing element.

2. The method of claim 1 which includes securing together two, identical subassemblies, to form the static-mixing element.

3. The method of claim 2 wherein the static-mixing element comprises a four-bladed, static-mixing element.

4. The method of claim 1 which includes:

a) securing together two subassemblies, to form a first subassembly module;

b) securing together two subassemblies, to form a second subassembly module; and c) securing together the first and second subassembly modules, to form the static-mixing element.

5. The method of claim 4 wherein the first and second subassembly modules are identical.

6. The method of claim 4 wherein the static-mixing element comprises an eight-bladed mixing element.

7. The method of claim 1 wherein the static-mixing element has an overall diameter of less than about twelve inches.

8. The method of claim 1 wherein each subassembly comprises two to three layers, and each layer is formed of at least two to four, generally parallel, spaced-apart, mixing blades.

9. The method of claim 2 wherein the subassembly comprises a first top layer of at least one arcuate mixing blade and at least two half-arcuate mixing blades, and a second lower layer comprises at least one full-arcuate, trapezoidal mixing blade and two half-arcuate, trapezoidal mixing blades.

10. The method of claim 4 wherein the first and second subassembly modules each comprises a subassembly of a first layer of at least three, spaced-apart, generally trapezoidal, mixing blades, and a lower layer of at least three, spaced-apart, trapezoidal-rectangular mixing blades, and a subassembly of a first top layer of at least one arcuate mixing blade and at least two half-arcuate mixing blades, and a second lower layer of at least one full-arcuate, trapezoidal mixing blade and two half-arcuate, trapezoidal mixing blades.

11. The method of claim 1 which includes inserting one or more of the manufactured static-mixing elements into a flow passageway.

12. The method of claim 1 which includes securing together, by lazer, tack, arc or resistant-welding, the subassemblies or subassembly modules positioned in a jig fixture, to form the static-mixing element.

13. The method of claim 12 which includes: providing a contoured, resistant-welded, jig fixture, with the internal contour selected to meet the contours of top and bottom subassemblies or subassembly modules of the static-mixing element; placing two subassemblies or subassembly modules within the fixture; and joining together the subassemblies or the subassembly modules by welding at contact points.

14. The method of claim 13 which includes employing, in the contoured jig fixture, a pair of nonconductive guide pins, to retain the subassemblies or subassembly modules in an arranged, defined position, prior to resistant-welding.

15. The method of claim 1 which includes forming the subassemblies of plastic, glass or ceramic material by molding.

16. The method of claim 1 which includes forming the subassemblies of metal, and welding together the subassemblies or subassembly modules, to form the static-mixing element.

17. The method of claim 1 which includes forming metal subassemblies by investment-casting or sintering.

18. The method of claim 1 which includes forming the subassemblies by molding the subassemblies in a powdered, metal sintering operation.

19. The method of claim 1 which includes securing together the subassemblies at the contact point between blade edges of each subassembly.

20. The method of claim 1 which includes securing together a plurality of the subassembly modules or a subassembly and one or more subassembly modules at selected contact points of the blade edges of the contacting modules or subassembly.

21. The method of claim 1 wherein the mixing blades are generally flat, metal blades with a thin blade edge with the blade edges at a 90° angle to each other.

22. A method of manufacturing a static-mixing element for insertion in a cylindrical flow passageway, having a diameter of about twelve inches or less, and for use in the motionless mixing of one or more fluid streams, by mixing blades which form the static-mixing element, which method comprises:

a) forming a first metal subassembly of the static-mixing element, which subassembly comprises a plurality of generally spaced-apart and parallel, metal, bladed elements in a two-layered, lattice-type structure;
b) preparing a second subassembly, the second subassembly comprising a plurality of spaced-apart, generally parallel, metal, mixing blade elements in a two-layered, lattice-type structure; and
c) arranging the first and second subassemblies together in a position within a fixture, and joining the first and second subassemblies together at selected contact points within the fixture, to form the static-mixing element, where the first and second subassemblies are identical.

23. A method of manufacturing a static-mixing element for insertion in a cylindrical flow passageway, having a diameter of about twelve inches or less, and for use in the motionless mixing of one or more fluid streams, by mixing blades having blade edges which form the static-mixing element, which method comprises:

a) forming a first metal subassembly of the static-mixing element, which subassembly comprises a plurality of generally spaced-apart and parallel, metal, blade elements in a two-layered, lattice-type structure;
b) preparing a second metal subassembly, the second subassembly comprising a plurality of spaced-apart, generally parallel, metal, mixing blade elements in a two-layered, lattice-type structure;
c) arranging the first and second subassemblies together in a position within a fixture, and joining the first and second subassemblies at selected blade edge contact points within the fixture, to form a first subassembly module;
d) repeating steps a), b) and c) to form a second subassembly module identical to the first subassembly module; and
e) joining together the first and second subassembly modules at selected blade edge contact points to form the static-mixing element.

* * * * *